United States Patent
Fang et al.

(10) Patent No.: US 11,410,035 B2
(45) Date of Patent: Aug. 9, 2022

(54) REAL-TIME TARGET DETECTION METHOD DEPLOYED ON PLATFORM WITH LIMITED COMPUTING RESOURCES

(71) Applicant: Jiangnan University, Wuxi (CN)

(72) Inventors: Wei Fang, Wuxi (CN); Peiming Ren, Wuxi (CN); Lin Wang, Wuxi (CN); Jun Sun, Wuxi (CN); Xiaojun Wu, Wuxi (CN)

(73) Assignee: Jiangnan University, Wuxi (CN)

( * ) Notice: Subject to any disclaimer, the term of this patent is extended or adjusted under 35 U.S.C. 154(b) by 308 days.

(21) Appl. No.: 16/885,450

(22) Filed: May 28, 2020

(65) Prior Publication Data

US 2020/0293891 A1 Sep. 17, 2020

Related U.S. Application Data

(63) Continuation of application No. PCT/CN2019/084060, filed on Apr. 24, 2019.

(51) Int. Cl.
  *G06N 3/08* (2006.01)
  *G06K 9/62* (2022.01)
  *G06N 3/04* (2006.01)

(52) U.S. Cl.
  CPC ............ *G06N 3/08* (2013.01); *G06K 9/6232* (2013.01); *G06N 3/04* (2013.01)

(58) Field of Classification Search
  None
  See application file for complete search history.

(56) References Cited

U.S. PATENT DOCUMENTS

2019/0012551 A1   1/2019   Fung et al.

FOREIGN PATENT DOCUMENTS

CN   108960067 A   12/2018
CN   109583355 A    4/2019

OTHER PUBLICATIONS

PCT/CN2019/084060 ISR ISA210 Mail Date Jan. 9, 2020.

*Primary Examiner* — Leon Flores
(74) *Attorney, Agent, or Firm* — IPro, PLLC

(57) ABSTRACT

Disclosed is a real-time object detection method deployed on a platform with limited computing resources, which belongs to the field of deep learning and image processing. In the present invention, YOLO-v3-tiny neural network is improved, Tinier-YOLO reserves the front five convolutional layers and pooling layers of YOLO-v3-tiny and makes prediction at two different scales. Fire modules in SqueezeNet, 1×1 bottleneck layers, and dense connection are introduced, so that the structure is used to achieve smaller, faster, and more lightweight network that can be run in real time on an embedded AI platform. The model size of Tinier-YOLO in the present invention is only 7.9 MB, which is only ¼ of 34.9 MB of YOLO-v3-tiny, and ⅛ of YOLO-v2-tiny. The reduction in the model size of Tinier-YOLO does not affect real-time performance and accuracy of Tinier-YOLO. Real-time performance of Tinier-YOLO in the present invention is 21.8% higher than that of YOLO-v3-tiny and 70.8% higher than that of YOLO-v2-tiny. Compared with YOLO-v3-tiny, accuracy of Tinier-YOLO is increased by 10.1%. Compared with YOLO-v2-tiny, accuracy of Tinier-YOLO is increased by nearly 18.2%. Tinier-YOLO in the present invention can still achieve real-time detection on a platform with limited resources, and effects are better.

8 Claims, 2 Drawing Sheets

REAL-TIME TARGET DETECTION METHOD DEPLOYED ON PLATFORM WITH LIMITED COMPUTING RESOURCES

TECHNICAL FIELD

The present invention relates to a real-time object detection method deployed on a platform with limited computing resources, and belongs to the field of deep learning and image processing.

BACKGROUND

Object detection is an important task in many emerging fields, such as robot navigation and automatic driving. In these complex scenarios, object detection methods based on deep learning show greater advantages than traditional method. Object detection algorithms based on deep learning continuously emerge, such as R-CNN, SPPNet, fast-R-CNN, faster-R-CNN, R-FCN, and FPN. Although these object detection algorithms achieve a breakthrough in accuracy, their detection speeds are not fast, far from meeting real-time requirements on devices with low computing capability. In addition, deep learning models usually occupy much storage space and require a GPU with powerful computing capability. However, in most practical application scenarios, powerful GPU workstations cannot be placed on devices.

Therefore, there is a need to find an object detection algorithm that has both excellent real-time performance and a smaller model size. YOLO is one of the fastest object detection methods with real-time performance and high accuracy. You Only Look Once (YOLO) has been continuously optimized since it was proposed. YOLO-V1 has two fully-connected layers and 24 convolutional layers, and the model size is up to 1 GB, which occupies very large storage space, and requires the running platform with high performance. On this basis, YOLO-V2 removes the fully-connected layers and introduces anchor boxes to predict bounding boxes. YOLO-V3 uses the residual structure to further deepen the network layer and achieves a breakthrough in accuracy. The tiny version of YOLO occupies less storage space, and Tiny-YOLO-V3 has storage space of only 34 MB, reaching an unprecedented lightweight. However, the storage capacity of the mobile terminal is still not small.

However, none of current versions of YOLO is capable of achieving real-time performance on embedded and mobile devices. YOLO still needs to be improved in terms of lightweight and real-time performance. According to the development trend of YOLO and current actual application scenarios, reducing model parameters, reducing storage space and improving accuracy are the current development trends. How to achieve real-time performance and accuracy of YOLO on embedded and mobile devices, and detect objects in real time is still a major challenge.

The skip-layer is proposed in both Highway and ResNet to enable information to flow at a high speed between input and output layers. The core idea is to create a shortcut connection to connect a middle layer, a front layer, and a later layer of a network, which is then explained in details in Densely Connected Convolutional Networks co-authored by Cornell University, Tsinghua University, and Facebook FAIR Labs. In order to maximize information flow between all layers in the network, authors connect all layers in the network in pairs, so that each layer in the network accepts features of all the front layers as input. Because there is a large quantity of dense connections in the network, authors call such a network structure a dense connection. The dense connection can alleviate gradient dispersion, which makes a model difficult to overfit, and enhance feature flowing between layers, which greatly reduces a quantity of parameters and increase training efficiency.

SqueezeNet is a network structure—with a small model that uses an existing convolutional neural network (CNN) model and compresses it through loss compression. The network model is trained with a small quantity of parameters for model compression. The network model uses a fire module structure, which is divided into a compression part and an expansion part. The compression part and the expansion part are connected to form a convolutional filter in a fire module. Usually, SqueezeNet starts with an independent convolutional layer (conv1), then 8 fire modules, and finally a final conversion layer (conv10).

SUMMARY

To resolve the above problem, the present invention provides a method that can be used for real-time multi-detection. The method of the present invention can be run on an embedded device such as Jetson TX1 or Jetson TX2, and a mobile device for object detection with higher accuracy and better real-time performance than those of the tiny version of YOLO.

Specifically, the technical solution of the present invention is an object detection method based on image processing, where the method includes the following steps:

(1) deploying Tinier-YOLO on a GPU platform, and performing image collection by using a camera, to obtain a corresponding image;

(2) Tinier YOLO reading the image collected by the camera;

(3) Tinier YOLO detecting and identifying the object information in the image;

(4) outputting the object information on a device screen or a screen of the camera in real time.

Tinier-YOLO is an improved YOLO-v3-tiny network structure, and the improvement method includes:

reserving alternate operations between front five convolutional layers and pooling layers of the YOLO-v3-tiny network structure, then sequentially connecting five fire modules in SqueezeNet, performing output to the first passthrough layer, then connecting the passthrough layer to the sixth fire module in SqueezeNet, connecting output feature maps of the five fire modules to the input of the sixth fire module through a dense connection, outputting the feature map of the sixth fire module to the second passthrough layer and a 1×1 bottleneck layer, then obtaining a third passthrough layer with a feature map size=of 26×26 through image enlarging performed by an upsampling layer on the feature map, then sequentially connecting—the seventh fire module and the eighth fire module in SqueezeNet for data compression, outputting the—feature map to a 1×1 bottleneck layer, and connecting to an output end, where a size of a feature map that is output is 26×26; in addition, the first passthrough layer and the third passthrough layer are separately connected to the fifth convolutional layer, to obtain an output feature of the fifth convolutional layer; the sixth fire module in SqueezeNet is also connected to an output end, and a size of a feature map that is output is 13×13; and retraining a network, to obtain Tinier-YOLO.

In an implementation manner of the present invention, the passthrough layer is introduced from the YOLO-v2 algorithm.

In an implementation manner of the present invention, connecting the output feature maps of the five fire modules to the input of the sixth fire module through a dense connection is that the output of the first to the fifth fire module is also used as the input of the sixth fire module.

In an implementation manner of the present invention, the third passthrough layer performs feature fusion on the enlarged image and the output of the feature map of the fifth convolutional layer.

In an implementation manner of the present invention, the image is a picture or an image in a video.

In an implementation manner of the present invention, the target is a person, a moving object, or a stationary object.

In an implementation manner of the present invention, the target is preferably a person or a stationary object.

In an implementation manner of the present invention, the moving object is a vehicle or an animal.

In an implementation manner of the present invention, the vehicle is an airplane, a ship, a train, a bus, a car, a motorcycle, a bicycle, etc.

In an implementation manner of the present invention, the animal is a cat, a dog, a sheep, a horse, a cattle, a bird, etc.

In an implementation manner of the present invention, the GPU platform is any device whose storage space is not less than 10 MB, such as Jetson TX1, Jetson TX2, iPhone, Huawei, or other smartphones. In particular, the method of the present invention can be applied to a platform with limited computing resources, namely an embedded platform or a mobile device with GPU processing performance.

In an implementation manner of the present invention, the embedded platform with GPU processing performance is an embedded device with equivalent performance, such as Jetson TX1 or Jetson TX2.

The present invention further provides an object detection apparatus based on image processing, where the apparatus includes an image collection module, a calculation module, and an output module, where the calculation module includes a calculation network and a hardware device, the image collection module is configured to collect an image, the calculation network is run on the hardware device to read the collected image and detect a target in the image, and then output the target information by using the hardware device or an image collection apparatus;

the calculation network is Tinier-YOLO, Tinier-YOLO is an improved YOLO-v3-tiny network structure, and the improvement method includes: reserving alternate operations between the front five convolutional layers and pooling layers of the YOLO-v3-tiny network structure, then sequentially connecting five fire modules in SqueezeNet, performing outputting to the first passthrough layer, then connecting the passthrough layer to the sixth fire module in SqueezeNet, connecting output feature maps of the five fire modules to the input of the sixth fire module through a dense connection, outputting the feature map of the sixth fire module to the second passthrough layer and a 1×1 bottleneck layer, then obtaining the third passthrough layer with a feature map size of 26×26 through image enlarging performed by an upsampling layer on the feature map, then sequentially connecting=the seventh fire module and the eighth fire module in SqueezeNet for data compression, outputting the data to a 1×1 bottleneck layer, and connecting to an output end, where a size of a feature map that is output is 26×26; in addition, the first passthrough layer and the third passthrough layer are separately connected to the fifth convolutional layer, to obtain an output feature of the fifth convolutional layer; the sixth fire module in SqueezeNet is also connected to an output end, where a size of a feature map that is output is 13×13; and retraining a network, to obtain Tinier-YOLO.

In an implementation manner of the present invention, the passthrough layer is introduced from the YOLO-v2 algorithm.

In an implementation manner of the present invention, connecting the output feature maps of the five fire modules to the input of the sixth fire module through a dense connection is that output of the first to the fifth fire module is also used as the input of the sixth fire module.

In an implementation manner of the present invention, the third passthrough layer performs feature fusion on the enlarged image and the output of the feature map of the fifth convolutional layer.

In an implementation manner of the present invention, the hardware device is a GPU platform, and the GPU platform is any device whose storage space is not less than 10 MB, such as Jetson TX1, Jetson TX2, iPhone, Huawei, or other smartphones. In particular, the method of the present invention can be applied to a platform with limited computing resources, namely an embedded platform or a mobile device with GPU processing performance.

In an implementation manner of the present invention, the embedded platform or the mobile device with GPU processing performance is preferably Jetson TX1 or Jetson TX2.

Beneficial Technical Effects Obtained by the Present Invention:

(1) The model size of Tinier-YOLO in the present invention is only 7.9 MB, which is only ¼ of 34.9 MB of YOLO-v3-tiny, and ⅛ of YOLO-v2-tiny. A reduction in the model size of Tinier-YOLO does not affect real-time performance and accuracy of Tinier-YOLO. In contrast, real-time performance of Tinier-YOLO in the present invention is 21.8% higher than that of YOLO-v3-tiny and 70.8% higher than that of YOLO-v2-tiny. Compared with YOLO-v3-tiny, the mean average prevision (mAP) of Tinier-YOLO is increased by 10.1%. Compared with YOLO-v2-tiny, the mean average prevision is increased by nearly 18.2%. It can be seen that Tinier-YOLO in the present invention can still achieve real-time detection on the platform with limited resources, and accuracy are higher.

(2) The present invention introduces fire modules into the calculation network, thereby reducing a quantity of model parameters, increasing the depth and width of the entire network, and ensuring model detection accuracy. In addition, detection accuracy is increased through using the dense connection. In addition to increasing accuracy, real-time performance of Tinier-YOLO is not lost through a proper dense connection.

(3) Tinier-YOLO in the present invention achieves installation and real-time monitoring on an embedded platform, requires less server communication, and can accurately detects more than 80 classes of objects through training, thereby resolving a prior-art problem that the calculation network cannot perform real-time operation on the embedded platform.

DETAILED DESCRIPTION

Figure 1:
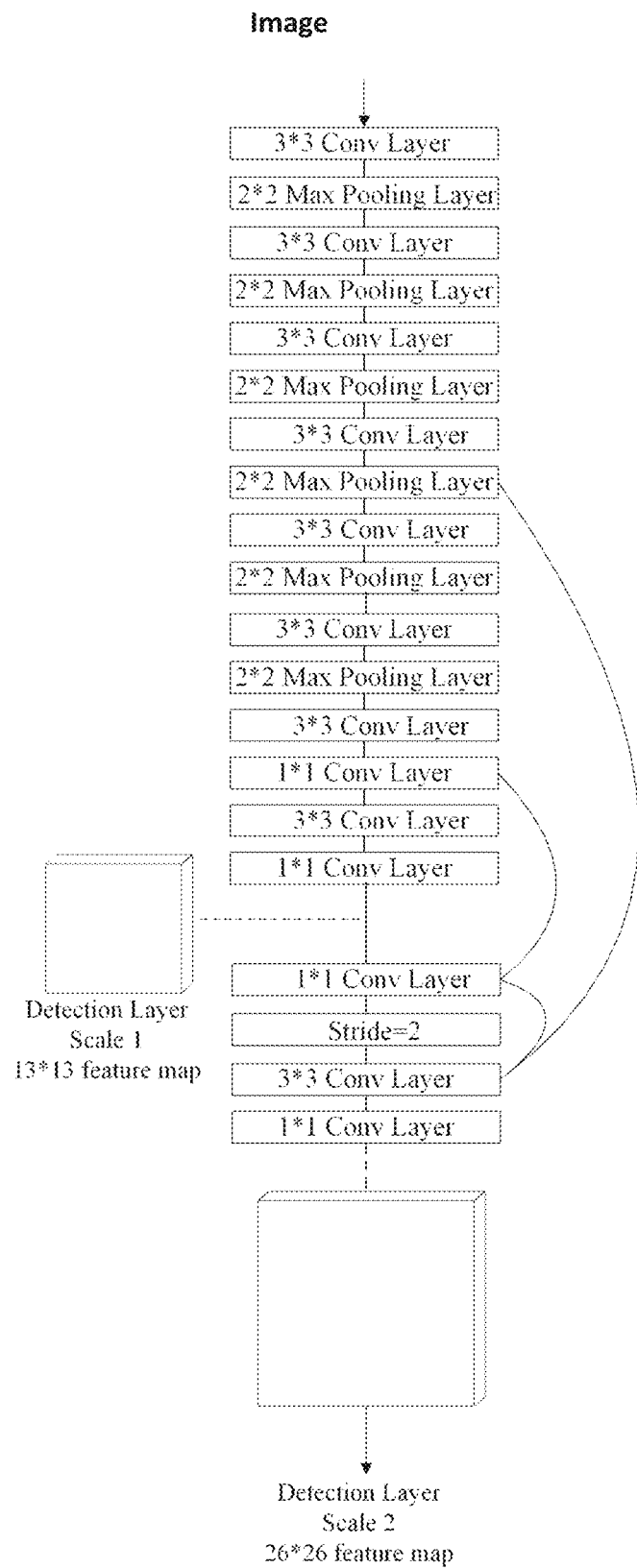
FIG. 1 is a schematic diagram of the YOLO-v3-tiny network structure.
Figure 2:
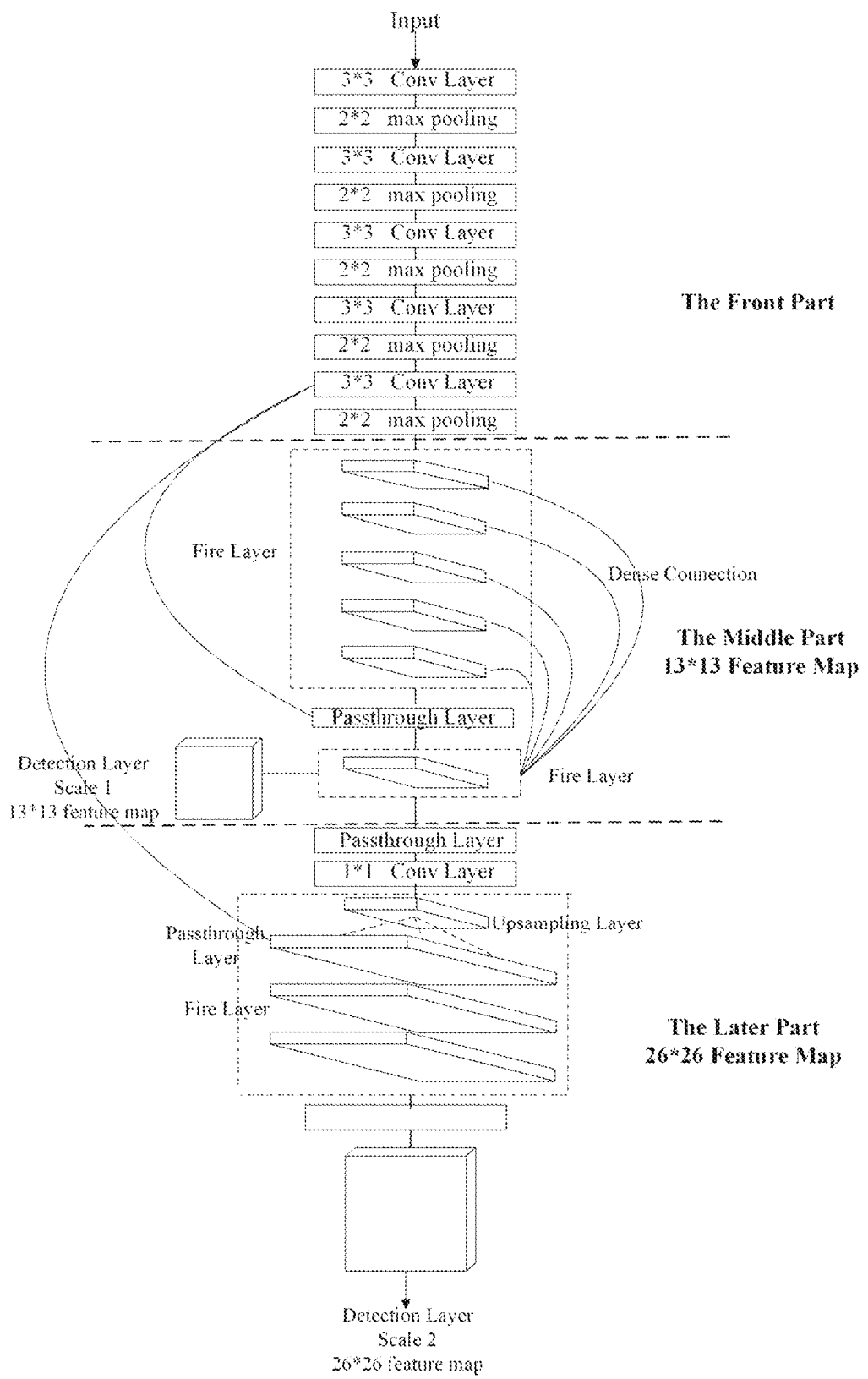
FIG. 2 is a schematic diagram of the Tinier-YOLO network structure according to the present invention, where (1) is the first fire module, (2) is the second fire module, (3) is the third fire module, (4) is the fourth fire module, (5) is the fifth fire module, (6) is the sixth fire module, (7) is the seventh fire module, (8) is the eighth fire module, (9) is the first passthrough layer, (10) is the second passthrough layer, and (11) is the third passthrough layer.

Description of Technical Terms:

AP: average precision, and the calculation formula is as follows:

$$AP = \Sigma_{i=1}^{n} P(i) \Delta r(i), \text{ where}$$

P(i) is precision with a given threshold i, and Δr(i) is a recall changing value between k and k−1.

Training and test dataset is the PASCAL VOC (The pattern analysis, statistical modeling, and computational learning Visual Object Classes Project), which includes VOC 2007 and VOC 2012. In the present invention, different classes of objects can be trained according to requirement. The training data includes a total of 16,551 images, 5,011 images in the VOC 2007 dataset and 11,540 images in the VOC 2012 dataset. The test data includes 4952 images from the VOC 2007.

EXAMPLE 1

The present example provides an object detection method based on image processing, and the method includes the following steps:

(1) deploying Tinier-YOLO on Jetson TX1, and performing image collection by using a camera, to obtain a corresponding image;

(2) Tinier YOLO reading the image collected by using the camera, where Tinier-YOLO is an improved YOLO-v3-tiny network structure, and the improvement method includes:

reserving alternate operations between the front five convolutional layers and pooling layers of the YOLO-v3-tiny network structure, then sequentially connecting five fire modules in SqueezeNet, performing outputting to a first passthrough layer, then connecting the passthrough layer to a sixth fire module in SqueezeNet, connecting output feature maps of the five fire modules to input of a sixth fire module through a dense connection, outputting data of the sixth fire module to a second passthrough layer and a 1×1 bottleneck layer, then obtaining a third passthrough layer with a feature map size of 26×26 through image enlarging performed by an upsampling layer on the data, then sequentially connecting a seventh fire module and an eighth fire module in SqueezeNet for data compression, outputting the data to a 1×1 bottleneck layer, and connecting to an output end, where a size of a feature map that is output is 26×26; in addition, the first passthrough layer and the third passthrough layer are separately connected to a fifth convolutional layer, to obtain an output feature of the fifth convolutional layer; the sixth fire module in SqueezeNet is also connected to an output end, and a size of a feature map that is output is 13×13; and retraining a network, to obtain Tinier-YOLO, where the passthrough layer is introduced from a YOLO-v2 algorithm;

connecting the output feature maps of the five fire modules to the input of the sixth fire module through a dense connection is that the output of the first to the fifth fire module is also used as the input of the sixth fire module; the third passthrough layer performs feature fusion on the enlarged image and the output of the feature map of the fifth convolutional layer;

(3) Tinier-YOLO detecting and identifying object information in the image;

(4) outputting the identified object information to a computer or a display screen in real time by using Jetson TX1.

The same method is performed on YOLO-v2-tiny and YOLO-v3-tiny, and the model size, real-time performance, and calculation precision of the three different neural networks are compared (1) Model Size of the Neural Network The model size and FLOPS (floating point operations per second) of YOLO-v2, YOLO-v2-tiny, YOLO-v3-tiny, and Tinier-YOLO are compared. Results are shown in Table 1. It can be seen that the model size of Tinier-YOLO is only 7.9 MB, which is ¼ of 34.9 MB of YOLO-v3-tiny and ⅛ of YOLO-v2-tiny.

FLOPS (floating point operations per second) is usually used to measure the computing capability required by a model. A larger FLOPS indicates a higher requirement on a device. As can be seen from Table 1, FLOPS of Tinier-YOLO is very low, making Tinier-YOLO more suitable for being embedded into an AI environment than the other algorithms.

TABLE 1

Storage and FLOPS values of the different neural network models

| Model | Model size | Real-time performance (FPS) | mAP | FLOPS/Bn |
|---|---|---|---|---|
| YOLO-V2 | 202.7 MB | 5 | — | 34.9 |
| YOLO-v2-tiny | 63.4 MB | 15.4 | 0.571 | 6.97 |
| YOLO-v3-tiny | 34.9 MB | 21.6 | 0.613 | 5.474 |
| Tinier-YOLO | 7.9 MB | 26.3 | 0.675 | 2.416 |
| Comparative Example 1 | 14.4 MB | 13.3 | 0.649 | — |
| Comparative Example 2 | 8.9 MB | 25.5 | 0.657 | 2.563 |

— indicates there is no data temporarily.

(2) Real-Time Performance

As shown in Table 1, by testing real-time performance of the different neural networks, Tinier-YOLO in the present invention can detect an object with 26.3 FPS on the Jetson TX1 platform. Compared with YOLO-v3-tiny, real-time performance is increased by 21.8%. Compared with YOLO-v2-tiny, real-time performance is increased by 70.8%. It can be seen that Tinier-YOLO in the present invention not only can be used in the embedded platform, but also can implement real-time monitoring performance.

(3) Mean Average Precision (mAP)

For the three different neural networks YOLO-v2-tiny, YOLO-v3-tiny, and Tinier-YOLO, different objects are detected according to the steps of Example 1. Average precision of each class and mean average precision (mAP) of 20 classes are shown in Table 1 and Table 2. It can be seen that, compared with YOLO-v3-tiny, mAP of Tinier-YOLO is increased by 6.2%. As shown in table 2, the average precision of the bird class is increased by 12.3%, and the average precision of the bottle class and the potted plant class are also increased by more than 10%. Compared with YOLO-v2-tiny, mAP is increased by nearly 10.4%, and the average precision of the bottle class is increased by 25.8%. Tinier-YOLO obtains more fine-grained features through the passthrough layers and multi-scale prediction, thereby improving the capability to detect small targets. The bold values in the Table 2 indicate the average precision of Tinier-YOLO are better than the other two models.

In summary, for Tinier-YOLO in the present invention, not only the model size is greatly reduced, but also real-time performance is improved. In addition, the detection accuracy is increased. It can be seen that the present invention provides a real-time detection method that can be used on the embedded platform, thereby resolving the prior-art problem that the real-time object detection cannot be performed on the embedded platform.

TABLE 2

Average precision of object detection using different neural network models

| Class | Tiny-YOLO-V2 | Tiny-YOLO-V3 | Tinier-YOLO |
|---|---|---|---|
| Average precision of the airplane class | 0.640 | 0.699 | 0.695 |
| Average precision of the bicycle class | 0.747 | 0.752 | 0.777 |
| Average precision of the bird class | 0.487 | 0.446 | 0.569 |
| Average precision of the ship class | 0.418 | 0.504 | 0.572 |
| Average precision of the bottle class | 0.182 | 0.330 | 0.44 |
| Average precision of the bus class | 0.701 | 0.730 | 0.784 |
| Average precision of the car class | 0.694 | 0.775 | 0.83 |
| Average precision of the cat class | 0.727 | 0.684 | 0.763 |
| Average precision of the chair class | 0.334 | 0.386 | 0.451 |
| Average precision of the cattle class | 0.539 | 0.600 | 0.686 |
| Average precision of the dining-table class | 0.585 | 0.592 | 0.692 |
| Average precision of the dog class | 0.636 | 0.612 | 0.692 |
| Average precision of the horse class | 0.738 | 0.756 | 0.786 |
| Average precision of the motor-bike class | 0.714 | 0.758 | 0.788 |
| Average precision of the human class | 0.616 | 0.716 | 0.764 |
| Average precision of the potted plant class | 0.256 | 0.284 | 0.393 |
| Average precision of the sheep class | 0.561 | 0.640 | 0.667 |
| Average precision of the sofa class | 0.528 | 0.588 | 0.701 |
| Average precision of the train class | 0.729 | 0.751 | 0.76 |
| Average precision of the television class | 0.601 | 0.650 | 0.679 |
| Average precision of the 20 classes | 0.571 | 0.613 | 0.675 |

Comparative Example 1

When a dense connection is used between the front five reserved convolutional layers in the YOLO-v3-tiny network structure. That is to say, the input of the second convolutional layer is the output of the first convolutional layer. The input of the third convolutional layer is the output of the first and second convolutional layers. The input of the fourth convolutional layer is output of the first to the third convolutional layers. The input of the fifth convolutional layer is the output of the first to the fourth convolutional layers. The rest is consistent with that for a Tinier-YOLO network structure in the present invention, and no dense connection is performed between the front five fire modules and the input of the sixth fire module. A network is trained and object detection is performed according to the method of Example 1.

Real-time performance is tested. Results are shown in Table 1. It can be seen that this change not only greatly increases calculation, but also greatly affects real-time performance. The detection speed (real-time performance) is only 13.3 FPS, the model is relatively large, and the precision is not high enough. The relatively poor speed performance of Comparative Example 1 is caused by calculation multiplication brought by large sizes of feature maps of the front convolutional layers.

Comparative Example 2

When the five fire modules are connected to the fifth max pooling layer through a dense connection, the input of the second fire module is the output of the first fire module, the input of the third fire module is the output of the first and second fire modules, and so on. In addition, the output of the fifth max pooling layer is separately input of the first to the fifth fire modules, the rest part is consistent with that for Tinier-YOLO in the present invention, and no dense connection is performed between the front five fire modules and the input of the sixth fire module. A network is trained, and object detection is performed according to the method of Example 1.

Real-time performance is tested, and results are shown in Table 1. It can be seen that frequent dense connections are performed between fire modules between smaller "13×13" feature maps in this Comparative Example. The detection speed is real-time, and the model size and mAP are also increased. However, compared with Tinier-YOLO in the present invention, even if such frequent connections are performed in Comparative Example 2, The mAP is not increased, but leads to an increase in parameters and calculation. There are redundant connections in the manner 2. Tinier-YOLO in the present invention densely connects the output feature maps of the front five fire modules to the input of the sixth fire module, which has better real-time performance than that in the manner 2. The mAP is increased by nearly 2%, and the model size is reduced by 1 MB.

EXAMPLE 2

The present example provides an object detection apparatus based on image processing, where in the apparatus comprises an image collection module, a calculation module, and an output module, where in the image collection module is configured to collect an image, the calculation module comprises a calculation network and a hardware device, the calculation network is run on the hardware device, to read the collected image, detect a target in the image, and then output, by using the hardware device or an image collection apparatus, target information obtained through detection; and the calculation network is Tinier-YOLO, Tinier-YOLO is an improved YOLO-v3-tiny network structure, and an improvement method comprises: reserving alternate operations between the front five convolutional layers and pooling layers of the YOLO-v3-tiny network structure, then sequentially connecting five fire modules in SqueezeNet, performing outputting to the first passthrough layer, then connecting the passthrough layer to the sixth fire module in SqueezeNet, connecting the output feature maps of the five fire modules to the input of the sixth fire module through a dense connection, outputting the feature map of the sixth fire module to the second passthrough layer and a 1×1 bottleneck layer, then obtaining the third passthrough layer with a feature map size of 26×26 through image enlarging performed by an upsampling layer on the feature map, then sequentially connecting the seventh fire module and the eighth fire module in SqueezeNet for data compression, outputting the feature map to a 1×1 bottleneck layer, and connecting to an output end, where in a size of a feature map that is output is 26×26; in addition, the first passthrough layer and the third passthrough layer are separately connected to the fifth convolutional layer, to obtain an output feature of the fifth convolutional layer; the sixth fire module in SqueezeNet is also connected to an output end, and a size of a feature map that is output is 13×13; and retraining a network, to obtain Tinier-YOLO.

The hardware device is a GPU platform, and the GPU platform is any device whose storage space is not less than 10 MB.

What is claimed is:

1. An object detection method based on image processing, comprising the following steps:
    (1) deploying Tinier- You Only Look Once (YOLO) on a Graphics Processing Unit (GPU) platform, and performing image collection by using a camera, to obtain a corresponding image;
    (2) reading, by Tinier-YOLO, the image collected by using the camera;
    (3) detecting and identifying, by Tinier-YOLO, target information in the image; and
    (4) outputting, in real time, the identified target information on a device screen or a screen of the camera,
    wherein Tinier-YOLO is an improved YOLO-v3-tiny network structure, and an improvement method comprises:
    reserving alternate operations between front five convolutional layers and pooling layers of the YOLO-v3-tiny network structure, then sequentially connecting five fire modules in SqueezeNet, performing outputting to a first passthrough layer, then connecting the first passthrough layer to a sixth fire module in SqueezeNet, connecting output feature maps of the five fire modules to input of the sixth fire module through a dense connection, outputting a feature map of the sixth fire module to a second passthrough layer and a 1×1 bottleneck layer, then obtaining a third passthrough layer with a feature map size of 26×26 through image enlarging performed by an upsampling layer on the feature map, then sequentially connecting a seventh fire module and a eighth fire module in SqueezeNet for data compression, outputting data to the 1×1 bottleneck layer, and connecting to an output end, wherein a size of a feature map that is output is 26×26; separately connecting the first passthrough layer and the third passthrough layer to a fifth convolutional layer, to obtain an output feature of the fifth convolutional layer; further connecting the sixth fire module in SqueezeNet to the output end, wherein a size of a feature map that is output is 13×13; and
    retraining a network, to obtain Tinier-YOLO.

2. The object detection method based on image processing according to claim 1, wherein the connecting the output feature maps of the five fire modules to the input of the sixth fire module through the dense connection is that output of first to fifth fire modules is also used as input of the sixth fire module.

3. The object detection method based on image processing according to claim 1, wherein the third passthrough layer performs feature fusion on an enlarged image and output of a feature map of the fifth convolutional layer.

4. The object detection method based on image processing according to claim 1, wherein a target is a person, a moving object, or a stationary object.

5. The object detection method based on image processing according to claim 1, wherein the GPU platform is any device whose storage space is not less than 10 MB.

6. The object detection method based on image processing according to claim 5, wherein the GPU platform comprises an embedded platform or a mobile device with GPU processing performance.

7. An object detection apparatus based on image processing, wherein the object detection apparatus comprises an image collection module, a calculation module, and an output module, the image collection module is configured to collect an image, the calculation module comprises a calculation network and a hardware device, and the calculation network is run on the hardware device, to read the collected image, detect a target in the image, and then output, by using the hardware device or an image collection apparatus, target information obtained through detection; and
    the calculation network is Tinier- You Only Look Once (YOLO), Tinier-YOLO is an improved YOLO-v3-tiny network structure, and an improvement method comprises:
    reserving alternate operations between front five convolutional layers and pooling layers of the YOLO-v3-tiny network structure, then sequentially connecting five fire modules in SqueezeNet, performing outputting to a first passthrough layer, then connecting the first passthrough layer to a sixth fire module in SqueezeNet, connecting output feature maps of the five fire modules to input of a sixth fire module through a dense connection, outputting data of the sixth fire module to a second passthrough layer and a 1×1 bottleneck layer, then obtaining a third passthrough layer with a feature map size of 26×26 through image enlarging performed by an upsampling layer on the data, then sequentially connecting a seventh fire module and a eighth fire module in SqueezeNet for data compression, outputting the data to the 1×1 bottleneck layer, and connecting to an output end, wherein a size of a feature map that is output is 26×26; separately connecting the first passthrough layer and the third passthrough layer to a fifth convolutional layer, to obtain an output feature of the fifth convolutional layer; further connecting the sixth fire module in SqueezeNet to the output end, wherein a size of a feature map that is output is 13×13; and
    retraining a network, to obtain Tinier-YOLO.

8. The object detection apparatus based on image processing according to claim 7, wherein the hardware device is a Graphics Processing Unit (GPU) platform, and the GPU platform is any device whose storage space is not less than 10 MB.

* * * * *